United States Patent
Cambois

(10) Patent No.: US 9,207,349 B2
(45) Date of Patent: Dec. 8, 2015

(54) METHODS AND APPARATUS FOR DETERMINING SEISMIC STREAMER ARRAY GEOMETRY AND SEISMIC SENSOR RESPONSE

(75) Inventor: Guillaume Cambois, Oslo (NO)

(73) Assignee: PGS Geophysical AS, Oslo (NO)

( * ) Notice: Subject to any disclaimer, the term of this patent is extended or adjusted under 35 U.S.C. 154(b) by 1028 days.

(21) Appl. No.: 13/274,995

(22) Filed: Oct. 17, 2011

(65) Prior Publication Data

US 2012/0069704 A1   Mar. 22, 2012

Related U.S. Application Data

(63) Continuation-in-part of application No. 12/229,847, filed on Aug. 27, 2008, now abandoned.

(51) Int. Cl.
   *G01V 1/38* (2006.01)
(52) U.S. Cl.
   CPC .................. *G01V 1/3835* (2013.01)
(58) Field of Classification Search
   CPC ........ G01V 1/364; G01V 1/38; G01V 1/3835
   USPC .......................................... 367/13, 19, 21, 24
   See application file for complete search history.

(56) References Cited

U.S. PATENT DOCUMENTS

| 4,979,150 | A | * | 12/1990 | Barr ................................ 367/24 |
| 5,443,027 | A | | 8/1995 | Owsley et al. |
| 5,757,720 | A | | 5/1998 | Soubaras |
| 5,774,417 | A | | 6/1998 | Corrigan et al. |
| 6,011,752 | A | | 1/2000 | Ambs et al. |
| 6,144,342 | A | | 11/2000 | Bertheas et al. |
| 6,681,887 | B1 | | 1/2004 | Kragh et al. |
| 7,239,577 | B2 | | 7/2007 | Tenghman et al. |
| 7,359,283 | B2 | | 4/2008 | Vaage et al. |
| 7,376,045 | B2 | | 5/2008 | Falkenberg et al. |
| 8,477,561 | B2 | * | 7/2013 | Singh et al. ..................... 367/20 |
| 2005/0265122 | A1 | | 12/2005 | Grion |
| 2006/0050611 | A1 | * | 3/2006 | Borresen ........................ 367/24 |
| 2007/0091719 | A1 | | 4/2007 | Falkenberg et al. |
| 2007/0140056 | A1 | | 6/2007 | Gratacos |
| 2008/0049551 | A1 | * | 2/2008 | Muyzert et al. ................ 367/24 |

FOREIGN PATENT DOCUMENTS

EP           0 786 670 A1      7/1997

OTHER PUBLICATIONS

Robert Soubaras, "Ocean bottom hydrophone and geophone processing", 1996, pp. 24-27, vol. 15, SEG Expanded Abstract.
Lasse Amundsen, "Wavenumber-based filtering of marine point-source data", Sep. 1993, pp. 1335-1348, Geophysics vol. 58, No. 9.

* cited by examiner

*Primary Examiner* — Daniel L Murphy

(57) ABSTRACT

A method for marine seismic surveying includes determining at least an initial depth of a plurality of spaced apart seismic sensors in a body of water. The sensors each include a substantially collocated pressure responsive sensor and motion responsive sensor. A ghost time delay is determined for each sensor based on the at least an initial depth. Seismic signals detected by each motion responsive sensor and each pressure responsive sensor are cross ghosted. The at least initial depth is adjusted, and the determining ghost time delay and cross ghosted seismic signals are repeated until a difference between the cross ghosted motion responsive signal and the cross ghosted pressure responsive signal falls below a selected threshold. Other embodiments, aspects and features are also disclosed.

18 Claims, 5 Drawing Sheets

METHODS AND APPARATUS FOR DETERMINING SEISMIC STREAMER ARRAY GEOMETRY AND SEISMIC SENSOR RESPONSE

CROSS-REFERENCE TO RELATED APPLICATIONS

The present application is a continuation-in-part of U.S. patent application Ser. No. 12/229,847, filed Aug. 27, 2008 by Guillaume Cambois.

BACKGROUND OF THE INVENTION

1. Field of the Invention

The invention relates generally to the field of marine seismic surveying. More particularly, the invention relates to methods for correcting marine seismic sensor array response for variations in array geometry during operation.

2. Background Art

Marine seismic surveying systems are used to acquire seismic data from Earth formations below the bottom of a body of water, such as a lake or the ocean. Marine seismic surveying systems typically include a seismic vessel having onboard navigation, seismic energy source control, and data recording equipment. The seismic vessel is typically configured to tow one or more streamers through the water. At selected times, the seismic energy source control equipment causes one or more seismic energy sources (which may be towed in the water by the seismic vessel or by another vessel) to actuate. Signals produced by various sensors on the one or more streamers are ultimately conducted to the recording equipment, where a record with respect to time is made of the signals produced by each sensor (or groups of such sensors). The recorded signals are later interpreted to infer the structure and composition of the Earth formations below the bottom of the body of water.

The one or more streamers are in the most general sense long cables that have seismic sensors disposed at spaced apart positions along the length of the cables. A typical streamer can extend behind the seismic vessel for several kilometers. Because of the great length of the typical streamer, the streamer may not travel entirely in a straight line behind the seismic vessel at every point along its length due to interaction of the streamer with the water and currents in the water, among other factors.

The quality of images of the Earth's subsurface produced from three dimensional seismic surveys is affected by how well the positions of the individual sensors on the streamers are known and controlled. The quality of images generated from the seismic signals also depends to an extent on the relative positions of the seismic receivers being maintained throughout the seismic survey. Various devices are known in the art for positioning streamers laterally and/or at a selected depth below the water surface. U.S. Pat. No. 5,443,027 issued to Owsley et al., for example, describes a lateral force device for displacing a towed underwater acoustic cable that provides displacement in the horizontal and vertical directions. The device has a hollow spool and a rotationally mounted winged fuselage. The hollow spool is mounted on a cable with cable elements passing therethrough. The winged fuselage is made with the top half relatively positively buoyant and the bottom half relatively negatively buoyant. The winged fuselage is mounted about the hollow spool with clearance to allow rotation of the winged fuselage. The difference in buoyancy between the upper and lower fuselage maintains the device in the correct operating position. Wings on the fuselage are angled to provide lift in the desired direction as the winged fuselage is towed through the water. The device disclosed in the Owsley et al. patent provides no active control of direction or depth of the streamer, however.

U.S. Pat. No. 6,011,752 issued to Ambs et al. describes a seismic streamer position control module having a body with a first end and a second end and a bore therethrough from the first end to the second end for receiving a seismic streamer. The module has at least one control surface, and at least one recess in which is initially disposed the at least one control surface. The at least one control surface is movably connected to the body for movement from and into the at least one recess and for movement, when extended from the body, for attitude adjustment. Generally, the device described in the Ambs et al. patent is somewhat larger diameter, even when closed, than the streamer to which it is affixed, and such diameter may become an issue when deploying and retrieving streamers from the water.

U.S. Pat. No. 6,144,342 issued to Bertheas et al. describes a method for controlling the navigation of a towed seismic streamer using "birds" affixable to the exterior of the streamer. The birds are equipped with variable-incidence wings and are rotatably fixed onto the streamer. Through a differential action, the wings allow the birds to be turned about the longitudinal axis of the streamer so that a hydrodynamic force oriented in any given direction about the longitudinal axis of the streamer is obtained. Power and control signals are transmitted between the streamer and the bird by rotary transformers. The bird is fixed to the streamer by a bore closed by a cover. The bird can be detached automatically as the streamer is raised so that the streamer can be wound freely onto a drum. The disclosed method purportedly allows the full control of the deformation, immersion and heading of the streamer.

Systems for determining relative positions of seismic streamers in the water are disclosed, for example, in U.S. Pat. No. 7,376,045 issued to Falkenberg et al. ("the '045 patent") and assigned to the assignee of the present invention. A system disclosed in the '045 patent includes a plurality of acoustic transmitters, mounted inside the streamers, adapted to transmit broadband signals having low cross-correlation between the signals of different transmitters; a plurality of acoustic receivers, mounted inside the streamers, adapted to receive the signals from the transmitters; at least one processor adapted to cross-correlate the signals received at the receivers with copies of transmitter signals to determine identities of the transmitters of the received signals and to determine travel times of the received signals; and a main processor adapted to convert the travel times to distances between the identified transmitters and the receivers and to determine relative positions of the streamers from the distances.

There continues to be a need for devices and methods for marine seismic streamers to determine and/or maintain depth and heading of the streamers along their length in order to improve the quality of seismic surveys.

SUMMARY OF THE INVENTION

A method for marine seismic surveying according to one aspect of the invention includes determining at least an initial depth of a plurality of spaced apart seismic sensors in a body of water. The sensors each include a substantially collocated pressure responsive sensor and motion responsive sensor. A ghost time delay is determined for each sensor based on the at least an initial depth. Seismic signals detected by each motion responsive sensor and each pressure responsive sensor are cross ghosted. The at least initial depth is adjusted, and the determining ghost time delay and cross ghosted seismic signals are repeated until a difference between the cross ghosted motion responsive signal and the cross ghosted pressure responsive signal falls below a selected threshold.

Other aspects and advantages of the invention will be apparent from the following description and the appended claims.

DETAILED DESCRIPTION

Figure 1:
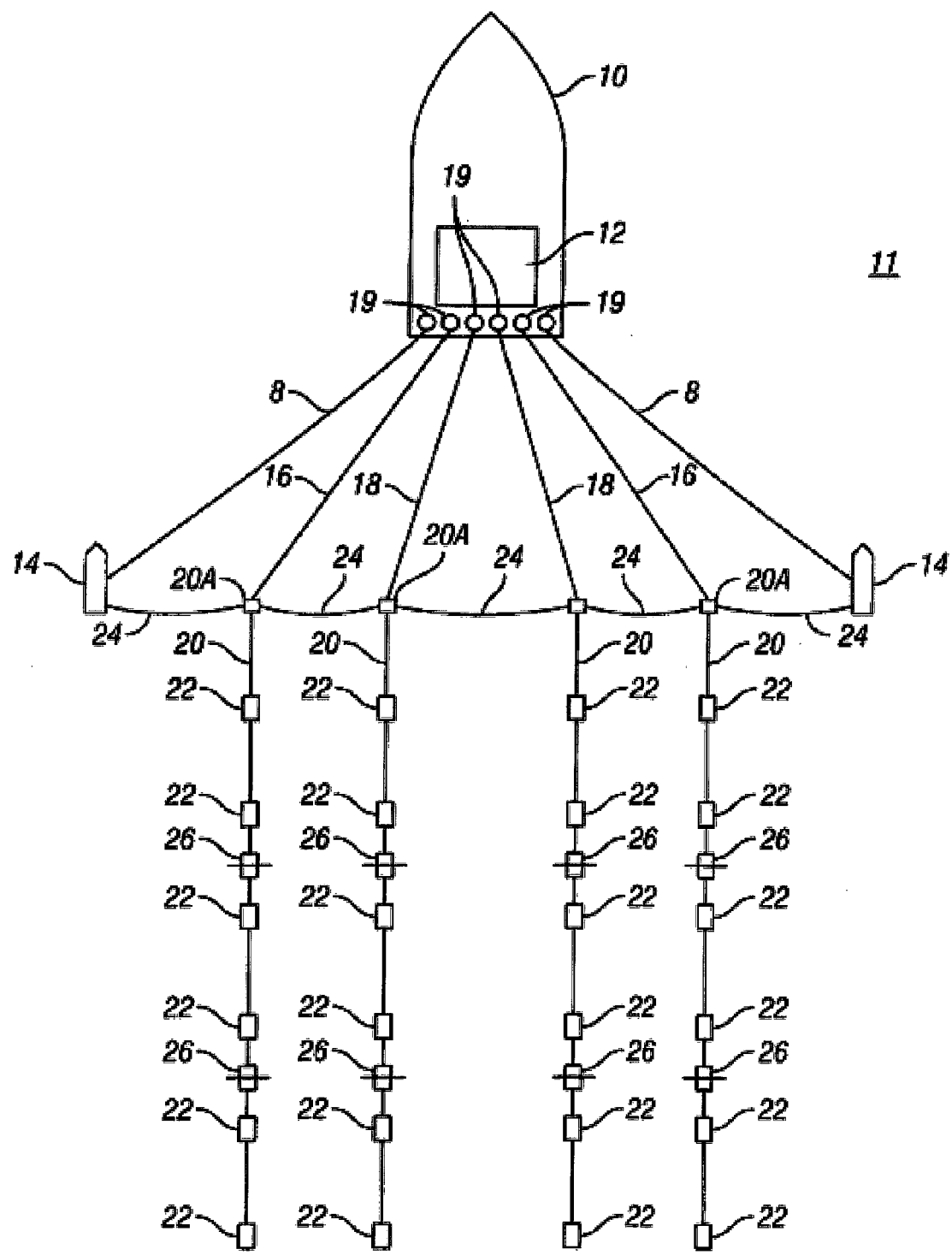
FIG. 1 shows an example "dual sensor" marine seismic acquisition system having lateral force and depth ("LFD") control devices in accordance with an embodiment of the invention.

FIG. 1 shows an example of a marine seismic survey system in accordance with an embodiment of the invention. The marine seismic survey system includes a seismic vessel 10 that moves along the surface of a body of water 11 such as a lake or the ocean. The seismic vessel 10 may include thereon certain equipment, shown at 12 and for convenience collectively called a "recording system." The recording system 12 typically includes a data recording unit (not shown separately) for making a record, typically indexed with respect to time, of signals generated by various seismic sensors (explained below) in the acquisition system. The recording system 12 also typically includes navigation equipment (not shown separately) to determine at any time the position of the vessel 10 and each of a plurality of seismic sensors 22 disposed at spaced apart locations on streamers 20 towed by the vessel 10. The recording system 12 may include devices (not shown separately) for selective actuation of a seismic energy source or array of such sources, as will be further explained with reference to FIG. 3. The foregoing elements of the recording system 12 are familiar to those skilled in the art and are not shown separately in the figures herein for clarity of the illustration.

The seismic sensors 22 can each be a combination of seismic sensors known in the art. In accordance with an embodiment of the invention, each seismic sensor may comprise a dual sensor including a directional sensor, such as a motion responsive sensor or acceleration sensor, substantially collocated with a non-directional sensor, such as a pressure sensor or pressure time gradient sensor. Examples of such sensors and streamers made therewith are described in U.S. Pat. No. 7,239,577 issued to Tenghamn et al. and assigned to the assignee of the present invention. The seismic sensors 22 measure seismic energy primarily reflected from various structures in the Earth's subsurface below the bottom of the water 11. The seismic energy originates from a seismic energy source (FIG. 3) deployed in the water 11. The seismic energy source (FIG. 3) may be towed in the water 11 by the seismic vessel 10 or by a different vessel (not shown).

In the seismic survey system shown in FIG. 1, there are four seismic sensor streamers 20 towed by the seismic vessel 10. The number of seismic sensor streamers may be different in other examples; therefore, the number of streamers such as shown in FIG. 1 is not a limit on the scope of the present invention. As explained in the Background section herein, in seismic acquisition systems such as shown in FIG. 1 that include a plurality of laterally spaced apart streamers, the streamers 20 are coupled to towing equipment that secures the forward ends of the streamers 20 at selected lateral positions with respect to each other and with respect to the seismic vessel 10. As shown in FIG. 1, the towing equipment can include two paravane tow ropes 8 each coupled to the vessel 10 at one end through a winch 19 or similar spooling device that enables changing the deployed length of each paravane tow rope 8. The distal end of each paravane tow rope 8 is functionally coupled to a paravane 14. The paravanes 14 are each shaped to provide a lateral component of motion to the various towing components deployed in the water 11 when the paravanes 14 are moved through the water 11. The lateral motion component of each paravane 14 is opposed to that of the other paravane 14, and is generally in a direction transverse to the centerline of the vessel 10. The combined lateral motion of the paravanes 14 separates the paravanes 14 from each other until they put into tension one or more spreader ropes or cables 24, functionally coupled end to end between the paravanes 14.

The streamers 20 are each coupled at the axial end thereof nearest the vessel 10 to a respective lead-in cable termination 20A. The lead-in cable terminations 20A are coupled to or are associated with the spreader ropes or cables 24 so as to fix the lateral positions of the streamers 20 with respect to each other and with respect to the vessel 10. Electrical and/or optical connection between the appropriate components in the recording system 12 and, ultimately, the sensors 22 (and/or other circuitry) in the ones of the streamers 20 inward of the lateral edges of the system may be made using inner lead-in cables 18, each of which terminates in a respective lead-in cable termination 20A. A lead-in termination 20A is disposed at the vessel end of each streamer 20. Corresponding electrical and/or optical connection between the appropriate components of the recording unit 12 and the sensors in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed.

The system shown in FIG. 1 may also include a plurality of LFD control devices 26 cooperatively engaged with each of the streamers 20 at selected positions along each streamer 20. Each LFD control device 26 can include rotatable control surfaces (FIG. 2) that when moved to a selected rotary orientation with respect to the direction of movement of such surfaces through the water 11 creates a hydrodynamic lift in a selected direction to urge the streamer 20 in any selected direction upward or downward in the water 11 or transverse to the direction of motion of the vessel. Thus, the LFD control devices 26 can be used to maintain the streamers 20 in a selected geometric arrangement. The LFD control devices 26 may be operated by command signals generated in the recording system 12 in response to control inputs that will be further explained below.

Figure 2:
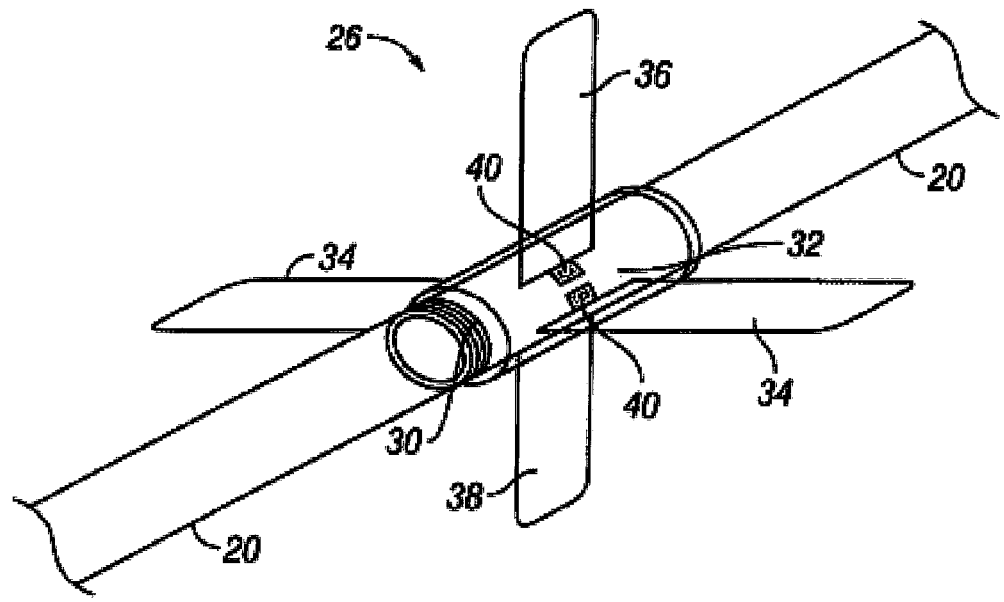
FIG. 2 shows an oblique view of one of the LFD control devices affixed to a streamer in accordance with an embodiment of the invention.

FIG. 2 shows an oblique view of one example of the LFD control devices 26 as it is coupled to a streamer 20 in accordance with an embodiment of the invention. As will be appreciated by those skilled in the art, a typical streamer is formed by coupling together end to end a plurality of streamer segments. Each streamer segment includes terminations at each longitudinal end. Each such termination may be coupled to a corresponding termination at one longitudinal end of another such streamer segment. The terminations typically include electrical and/or optical couplings to enable power and/or signal communication between electrical and/or optical cables disposed in each streamer segment. The terminations also include a feature for coupling the termination to one or more strength members in each streamer segment and thus transmit axial load from one streamer segment to the next through the interconnected terminations. In the present embodiment, the LFD control device 26 forms a coupling that may be disposed between the terminations of two streamer segments. The LFD control device 26 may include an outer housing 32 rotatably affixed to an inner housing 30. An outer housing 32 may include about its circumference four, substantially orthogonally disposed control surfaces 34, 36 and 38. The control surfaces 34, 36, 38 may be planar, or may have a generally airfoil shaped cross section to reduce turbulence as the LFD control device 26 is moved through the water (11 in FIG. 1). The control surfaces 34, 36, 38 may be coupled to the outer housing 32 using quick connects 40. The quick connects 40 provide the system user with the ability to rapidly install and remove all the control surfaces 34, 36, 38 from the outer housing 32 during deployment and retrieval of a streamer having such LFD control devices 26 included therein. The outer housing 32 includes therein devices (not shown) that cause the control surfaces 34, 36, 38 to rotate about axes that may be substantially perpendicular to the longitudinal axis of the outer housing 32 and in the plane of each control surface 34, 36, 38.

In the present example, the control surface 36 shown in the uppermost position may be positively buoyant. The control surface 38 shown in the lowermost position may be negatively buoyant. The two control surfaces 34 shown in approximate horizontal orientation may be substantially neutrally buoyant. Such arrangement of buoyancy of the various control surfaces 34, 36, 38 provides that the outer housing 32 will remain substantially in the rotary orientation shown in FIG. 2 notwithstanding the effects of torque on the streamer during operation that may cause the inner housing 30 to rotate correspondingly.

FIG. 2 shows the control surfaces of the LFD 26 in a neutral position, wherein the plane of each control surface is substantially along the direction of motion of the streamer through the water. Rotation of the vertically oriented control surfaces 36, 38 may be used to affect lateral direction of the streamer, and rotation of the horizontally oriented control surfaces 34 may be used to affect the depth (vertical direction) of the streamer.

In some implementations, the dimensions of the inner housing 30 and outer housing 32 are selected such that when the control surfaces 34, 36, 38 are removed using the quick connects 40, the external diameter of the outer housing 32 is about the same as that of the streamer 20. The LFD devices 26 may be used in some examples, explained in more detail below, to adjust the array geometry.

Figure 3:
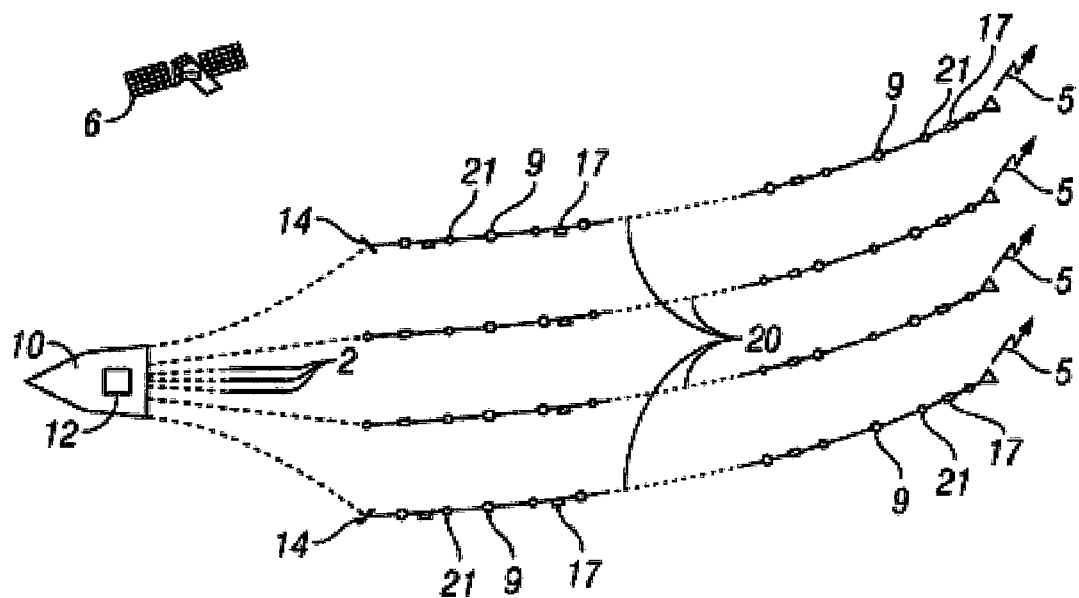
FIG. 3 shows a plan view of a system such as shown in FIG. 1 including acoustic devices for determining relative positions of the sensors in the streamers in accordance with an embodiment of the invention.

FIG. 3 is a plan view of a different example seismic acquisition, in which devices for determining positions of the towed marine seismic streamers are included, in accordance with an embodiment of the invention. As in FIG. 1, above, a seismic survey vessel 10 tows devices in the water including a seismic energy source consisting of air gun arrays 2, and a spread of four streamers 20. The streamers 20 extend from paravanes 14 at the front of the spread to tail buoys 5 at the rear. GPS receivers (not shown separately) may be located on the vessel 10, on the paravanes 14 and on tail buoys 5, to receive signals from navigation satellites 6 in space and provide accurate geodetic positions of certain reference points in the system.

The streamer position determining system further comprises a number of acoustic transmitters 9 and receivers 21 mounted inside the sections (not designated here) of the streamers 20. The acoustic transmitters 9 and receivers 21 communicate with a main processor in the recording system 12 via an electrical and/or cable bundle within the streamers 20. The main processor is typically located in the recording system 12 onboard the survey vessel 10, although this location should not be considered a limitation of the invention. A transmitter 9 and a receiver 21 may be combined in one transducer unit, although this combination should not be considered a limitation of the invention. If the transmitter 9 and receiver 21 are combined into one transducer unit, then this transducer unit can act as either a transmitter 9 or a receiver 21 or even both (although not simultaneously). Any or all of the acoustic receivers 21 may be configured to measure absolute pressure in the water as well as to detect signals from the transmitters 9, or separate pressure sensors may be included in the streamers proximate each of the seismic sensors (22 in FIG. 1) to determine the depth of each of the seismic sensors in the water.

In one example the acoustic system for determining streamer positions transmits signals within the frequency range of 10 kHz to 40 kHz. This frequency band is selected to avoid signal degradation in hostile acoustic environments that occurs when higher ultrasonic frequencies are utilized and the decreased signal resolution that occurs when lower frequencies are utilized. The transmitters 9 transmit an acoustic signal in the water and the receivers 11 receive these transmitted signals. Several transmitters 9 may transmit at the same time, but different transmitters 9 transmit different signals. The different signals from different transmitters have low cross correlation, so that a receiver 11 can distinguish between different transmitter signals even if the signals arrive simultaneously. The foregoing components of a streamer location system are described more fully in U.S. Pat. No. 7,375,045 issued to Falkenberg et al. and assigned to the assignee of the present invention. Use of a system for determining position as described herein may provide improved results for a method according to the invention as will be further explained below, however the use of such position determining system is not a limit on the scope of the invention.

Figure 4:
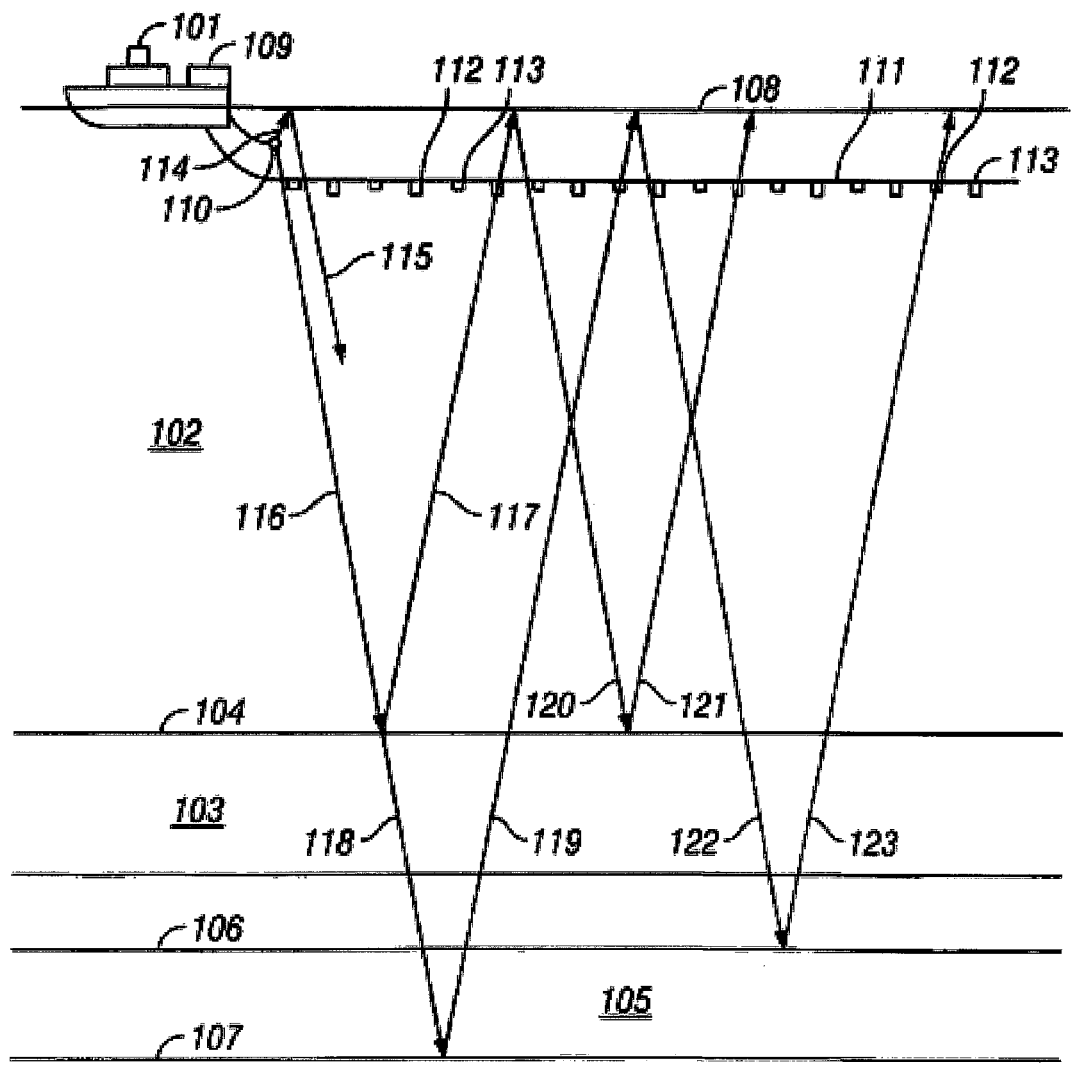
FIG. 4 shows an example of seismic energy being emitted and detected by various sensors on one of the streamers shown in FIG. 1 to illustrate a principle of the invention.

FIG. 4 shows an example of the acquisition of marine seismic data in accordance with an embodiment of the invention. The seismic vessel 101 moves along the surface 108 of a body of water 102 above a portion 103 of the subsurface that is to be surveyed. Beneath the water bottom 104, the portion 103 of the subsurface contains rock formations of interest such as a layer 105 positioned between an upper boundary 106 and lower boundary 107 thereof. The seismic vessel 101 contains seismic acquisition control equipment, designated generally at 109. The seismic acquisition control equipment 109 includes navigation control, seismic energy source control, seismic sensor control, and signal recording equipment, all of which can be of types well known in the art.

The seismic acquisition control equipment 109 causes a seismic source 110 towed in the body of water 102 by the seismic vessel 101 (or by a different vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 (or by a different vessel) to detect the acoustic wavefields initiated by the seismic source 110 and reflected from interfaces in the environment. Only one seismic streamer 111 is shown in FIG. 4 for illustrative purposes. As shown in FIG. 1 and FIG. 3, typically a plurality of laterally spaced apart seismic streamers 111 are towed behind the seismic vessel 10. In the present example the seismic streamers 111 contain pressure responsive sensors such as hydrophones 112, and water particle motion responsive sensors such as geophones 113. The hydrophones 112 and geophones 113 are typically co-located in pairs or pairs of sensor arrays at regular intervals along the seismic streamers 111.

Each time the seismic source 110 is actuated, an acoustic wavefield travels in spherically expanding wave fronts. The propagation of the wave fronts will be illustrated herein by ray paths which are perpendicular to the wave fronts. An upwardly traveling wavefield, designated by ray path 114, will reflect off the water-air interface at the water surface 108 and then travel downwardly, as in ray path 115, where the wavefield may be detected by the hydrophones 112 and geophones 113 in the seismic streamers 111. Such a reflection from the water surface 108, as in ray path 115 contains no useful information about the subsurface formations of interest. However, such surface reflections, also known as ghosts, act as secondary seismic sources with a time delay from initiation of the seismic source 110.

The downwardly traveling wavefield, in ray path 116, will reflect off the earth-water interface at the water bottom 104 and then travel upwardly, as in ray path 117, where the wavefield may be detected by the hydrophones 112 and geophones 113. Such a reflection at the water bottom 104, as in ray path 117, contains information about the water bottom 104. Ray path 117 is an example of a "primary" reflection, that is, a reflection originating from a boundary in the subsurface. The downwardly traveling wavefield, as in ray path 116, may transmit through the water bottom 104 as in ray path 118, reflect off a layer boundary, such as 107, of a layer, such as 105, and then travel upwardly, as in ray path 119. The upwardly traveling wavefield, ray path 119, may then be detected by the hydrophones 112 and geophones 113. Such a reflection off a layer boundary 107 contains useful information about a formation of interest 105 and is also an example of a primary reflection.

The acoustic wavefields will continue to reflect off interfaces such as the water bottom 104, water surface 108, and layer boundaries 106, 107 in combinations. For example, the upwardly traveling wavefield in ray path 117 will reflect off the water surface 108, continue traveling downwardly in ray path 120, may reflect off the water bottom 104, and continue traveling upwardly again in ray path 121, where the wavefield may be detected by the hydrophones 112 and geophones 113. Ray path 121 is an example of a multiple reflection, also called simply a "multiple", having multiple reflections from interfaces. Similarly, the upwardly traveling wavefield in ray path 119 will reflect off the water surface 108, continue traveling downwardly in ray path 122, may reflect off a layer boundary 106 and continue traveling upwardly again in ray path 123, where the wavefield may be detected by the hydrophones 112 and geophones 113. Ray path 123 is another example of a multiple reflection, also having multiple reflections in the subterranean earth.

For purposes of the following explanation, the terms "hydrophone" and "geophone" will be used as shorthand descriptions for the types of signals being processed. It is to be clearly understood that the term "hydrophone" in the following description is intended to mean signals detected by any form of pressure responsive or pressure time gradient responsive sensor. Correspondingly, "geophone" signals are intended to mean signal detected by any form of particle motion responsive sensor, including accelerometers, velocity meters and the like.

A method according to an embodiment of the invention begins using the recorded hydrophone and geophone signals corresponding to each actuation of the source. The recordings may be compensated for their respective sensor and recording channels' impulse responses and the transduction constant of each type of sensor used. Each such record of hydrophone and geophone recordings corresponding to a particular actuation of the source may be referred to as a "common shot" record or common shot "gather." The signal recordings may be indexed with respect to time of actuation of the seismic source, and may be identified by the geodetic position of each seismic sensor at the time of recording. The geophone signals may be normalized with respect to the angle of incidence of the seismic wave front detected by each geophone. See, for example, U.S. Pat. No. 7,359,283 issued to Vaage et al. and assigned to an affiliate of the assignee of the present invention for a description of such normalization. The hydrophone response is substantially omni-directional and typically does not require correction or normalization for angle of incidence. A correction filter, w, may be determined to cause the hydrophone impulse response h and the geophone impulse response g to substantially match as in the following expression:

$$h = g * w \quad (1)$$

In a practical implementation of a method, the normalized common-shot records may be transformed from the time-position domain (where position represents the geodetic position of each sensor at the time of signal recording) into the frequency-wavenumber (f–k) domain. The resulting domain-transformed signals may be represented by the following mathematical expressions:

$$H = h P_{up}(1-Z)$$

$$G = g P_{up}(1+Z) \quad (2)$$

where H represents the f–k transform of the hydrophone signals, G represents the f–k transform of the geophone signals, h is the hydrophone impulse response, and g is the geophone impulse response. $P_{up}$ represents the upwardly propagating pressure wave field, Z represents the frequency-domain time delay operator:

$$Z = \exp[2\pi i f(2z \cos \phi)v)] \quad (3)$$

in which i is the imaginary number $\sqrt{-1}$, f represents the seismic energy frequency, z represents the sensor depth in the water, $\phi$ represents the angle of incidence of the seismic energy at the sensor, and v represents seismic velocity in the water. The seismic energy frequency f, the angle of incidence of the seismic energy at the sensor $\phi$, and the seismic velocity v may be determined from the sensor data. The quantities (1+Z) and (1−Z) represent the geophone and hydrophone "ghosting" functions, respectively. The time delay and the respective ghosting functions are related to the depth of each seismic sensor and the velocity of seismic energy in the water if it is known or is readily determinable. The present example includes transformation of the hydrophone and geophone signals into the frequency-wavenumber domain in particular to facilitate calculating the geophone and hydrophone ghosting functions. It is to be understood that other implementations may process the signals other than in the frequency-wavenumber domain.

In a method according to the invention, the hydrophone signals and the geophone signals are cross ghosted using expressions such as the following in which # denotes a cross ghosted signal:

$$H\# = H(1+Z) \text{ and } G\# = w\, G(1-Z) \quad (4)$$

If the values of w and z are correct, then the cross ghosted geophone and hydrophone signals will be substantially equal, and their difference will be substantially zero:

$$H\# = G\# \text{ and } H\# - G\# = 0 \quad (5)$$

Assuming, for example, that either the sensor depth z or calibration filter w is not correct, then:

$$H\#' = H(1+Z') \text{ and } G\#' = w'G(1-Z') \quad (6)$$

Where Z' corresponds to the ghost time delay at the incorrect depth, and w' is the incorrect calibration. In such case the difference $H\#' - G\#'$ will not be equal to zero. In the present example, a value of w may be perturbed or varied, and a value of z for each seismic sensor (22 in FIG. 1) may be perturbed or varied, and values of Z may be calculated using equation (2). The foregoing perturbed values may be used in equation (3) to determine cross ghosted signals using the perturbed values. The foregoing process is repeated until values of w and z are determined such that the difference between the calculated cross ghosted signals, $H\# - G\#$, reaches a minimum. The values of depth of each sensor z so determined may be used as the correct depth of each sensor in determining the geometry of the sensor array.

In other examples, in addition to calculating a sensor depth for each sensor as explained above, the relative positions of the sensors with respect to each other (e.g., the plan view shown in FIG. 1) may be determined by perturbing the angle of incidence of the seismic energy at each sensor and recalculating the cross ghosting time delay function Z using equation (3). Differences between the cross ghosted sensor responses calculated as explained above may be determined, and the perturbing of positions, calculating of cross ghosting time delay function and determining difference may be repeated until differences between the cross ghosted signals are minimized.

In some examples, signals from the acoustic position determining system (FIG. 3) may be used to initialize the x and y values of the relative (lateral) position of each seismic sensor and the depth z thereof in performing the procedure explained above. The lateral position of each seismic sensor may be relative to a reference point in the acquisition system which may be, for example, on the vessel 10 or within the spread of streamers 20.

In another example, the determined relative positions and depths may be used as input control signals to operate the LFD devices (26 in FIG. 1) to cause the sensor depths and relative positions to be optimized or normalized. In some examples, the LFD devices may be operated to adjust the actual depth and/or the actual lateral positions of the seismic sensors so that the difference between the cross ghosted signals at each sensor is minimized or falls below a selected threshold.

Figure 5:
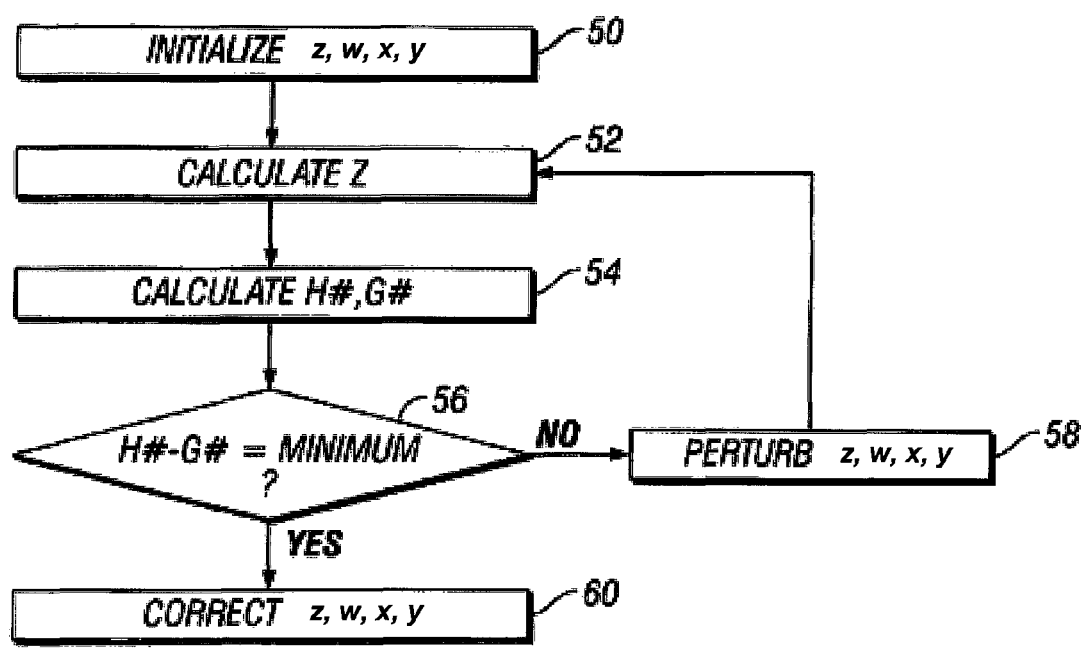
FIG. 5 shows a flow chart of an example method in accordance with an embodiment the invention.

A flow chart showing the elements of an example method according to an embodiment of the invention is shown in FIG. 5. At 50, values for each seismic sensor, including a value for a depth z, a correction filter w (which may be referred to as a calibration factor and causes matching of the geophone and hydrophone impulse response signals, as discussed above), and relative lateral positions x, y may be initialized. As explained above, data to initialize the foregoing x, y and z values may be obtained from the various components and known dimensions of the position determination system (FIG. 3). For example, the initial value for the depth z for each sensor may be determined from a measurement of pressure at the sensor. The correction filter w may be initialized to an approximate function or value based on impulse response measurements of the sensors. At 52, values of the ghost time delay function Z may be calculated for each seismic sensor. At 54, values of the cross ghosted hydrophone and geophone signals, H# and G#, respectively may be calculated for each seismic sensor using the foregoing values of Z. At 56, a difference between the cross ghosted signals is determined for each seismic sensor. If the cross ghosted seismic signal differences are at a minimum, at 60, then the correct values of z, w, x and y have been determined for each seismic sensor. If the differences are not at a minimum, then at 58, one or more of the values of z, w, x and y may be perturbed or adjusted, and the process may return to calculation of Z using the perturbed value(s). The foregoing may be repeated until the difference between the cross ghosted signals reaches a minimum or falls below a selected threshold.

In accordance with an embodiment of the invention, the value for the depth z, the correction filter w, and the position values (x, y) for the lateral positions for each of the plurality of seismic sensors may each be periodically adjusted. This may be accomplished by periodically performing the above discussed method starting at step 52 until the difference between cross ghosted signals is minimized and the correct z, w, x, and y are determined per step 60. Such periodic adjustment may be used advantageously to track changes in the geometry of the sensor array as the depths and relative positions of the seismic sensors vary over time during the seismic survey.

Methods according to the invention may provide better determination of sensor position in a seismic sensor array than is possible using techniques known in the art. Methods according to the invention may provide more precise control over the position of seismic sensors in an array when used in conjunction with active streamer positioning control devices.

Figure 6:
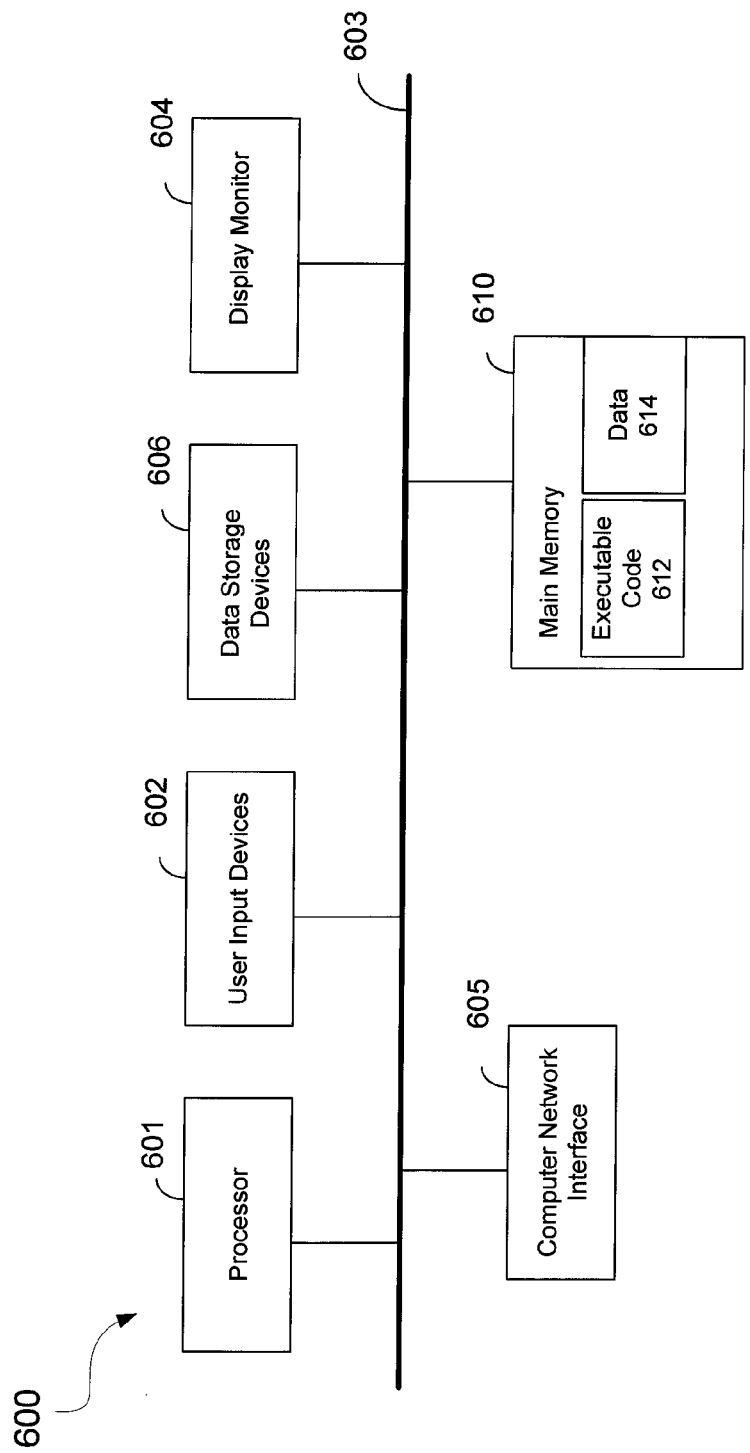
FIG. 6 shows an example computer apparatus which may be used for processing data within the recording system in accordance with an embodiment of the invention.

FIG. 6 shows an example computer apparatus which may be used for processing data within the recording system in accordance with an embodiment of the invention. The computer apparatus 600 may be configured with executable instructions so as to perform the data processing methods described herein. This figure shows just one example of a computer which may be used to perform the data processing methods described herein. Many other types of computers may also be employed, such as multi-processor computers, server computers, cloud computing via a computer network, and so forth.

The computer apparatus 600 may include a processor 601, such as those from the Intel Corporation of Santa Clara, Calif., for example. The computer apparatus 600 may have one or more buses 603 communicatively interconnecting its various components. The computer apparatus 600 may include one or more user input devices 602 (e.g., keyboard, mouse), one or more data storage devices 606 (e.g., hard drive, optical disk, USB memory), a display monitor 604 (e.g., LCD, flat panel monitor, CRT), a computer network interface 605 (e.g., network adapter, modem), and a main memory 610 (e.g., RAM).

In the example shown in this figure, the main memory 610 includes executable code 612 and data 614. The executable code 612 may comprise computer-readable program code (i.e., software) components which may be loaded from the data storage device 606 to the main memory 610 for execution by the processor 601. In particular, the executable code 612 may be configured to perform the data processing methods described herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for using a marine seismic surveying system having a plurality of seismic sensors which are spaced apart and towed, the method comprising:
    determining at least a value for a depth of each of the plurality of seismic sensors in a body of water, the seismic sensors each including a pressure responsive sensor and a motion responsive sensor;
    determining a ghost time delay based on at least the value for the depth;
    cross ghosting seismic signals detected by each motion responsive sensor and each pressure responsive sensor to obtain a cross ghosted motion responsive signal and a cross ghosted pressure responsive signal, wherein the cross ghosting uses a calibration factor for each seismic sensor;
    computing a difference between the cross ghosted motion responsive signal and the cross ghosted pressure responsive signal for each of the seismic sensors;
    adjusting at least the value for the depth of each of the seismic sensors based on the difference;
    repeating determining the ghost time delay, cross ghosting the seismic signals, and computing the difference;
    repeating the adjusting at least the value for the depth, determining the ghost time delay, cross ghosting the seismic signals, and computing the difference until the difference falls below a selected threshold;
    operating lateral control devices to perform lateral movement of the seismic sensors;
    computing the difference for each seismic sensor after said lateral movement; and
    determining whether the difference for each seismic sensor is thereby reduced,
    wherein the method is performed during operation of the marine seismic survey system.

2. The method of claim 1, wherein determining the value for the depth comprises measuring pressure at each seismic sensor.

3. The method of claim 1 further comprising:
    determining an initial factor for the calibration factor each seismic sensor,
    wherein adjusting at least the value for the depth of each seismic sensor includes adjusting the calibration factor based on the difference between the cross ghosted signals.

4. The method of claim 3, wherein a motion-responsive impulse response shaped by a correction filter substantially matches a pressure-responsive impulse response.

5. The method of claim 1 further comprising:
    determining position values for a lateral position of each seismic sensor,
    wherein adjusting at least the value for the depth of each seismic sensor includes adjusting the position values for the lateral position of each seismic sensor.

6. The method of claim 1, further comprising:
    periodically adjusting the value for the depth of each of the plurality of seismic sensors so that the difference falls below the selected threshold.

7. The method of claim 1, further comprising:
    periodically adjusting the value for the depth and position values for the lateral position of each of the plurality of seismic sensors so that the difference falls below the selected threshold.

8. The method of claim 1, further comprising:
    periodically adjusting the value for the depth, position values for the lateral position, and the calibration factor of each of the plurality of seismic sensors so that the difference falls below the selected threshold.

9. An apparatus for marine seismic surveying, the apparatus comprising:
    a plurality of towed streamers;
    a plurality of spaced apart seismic sensors on the streamers, each seismic sensor including a pressure responsive sensor and a motion responsive sensor which are substantially collocated;
    lateral control devices to perform lateral movement of the seismic sensors; and
    a recording system communicatively coupled to the plurality of spaced apart seismic sensors, the recording system including a data storage system to store computer-readable code and data, a processor configured to access the data storage system and execute computer-readable program code; and computer-readable program code configured to adjust at least a value for a depth of each seismic sensor until a difference between cross ghosted motion responsive and pressure responsive signals for each seismic sensor is below a selected threshold, wherein the computer-readable program code is further configured to compute the difference for each of the seismic sensors after said lateral movement.

10. The apparatus of claim 9, wherein the computer-readable code is further configured to adjust a calibration factor for each seismic sensor, in addition to the value for the depth, until the difference is below the selected threshold.

11. The apparatus of claim 10, wherein a motion-responsive impulse response shaped by the calibration factor substantially matches a pressure-responsive impulse response.

12. The apparatus of claim 10, further comprising:
    computer-readable program code configured to compute the cross ghosted motion responsive signal using the calibration factor.

13. The apparatus of claim 10, wherein the computer-readable code is further configured to periodically adjust the value for the depth and the calibration factor of each of the plurality of seismic sensors so that the difference falls below the selected threshold.

14. The apparatus of claim 9, wherein the computer-readable code is further configured to adjust position values for a lateral position of each seismic sensor, in addition to the value for the depth, compute the difference, and determine whether the difference is below the selected threshold.

15. The apparatus of claim 14,
    wherein the lateral control devices comprise lateral force and depth (LFD) control devices communicatively coupled to the recording system and cooperatively engaged at a plurality of positions along each of the streamers so as to control a lateral position and depth of the seismic sensors, and
    wherein the computer-readable code is further configured to provide input control signals to operate the LFD devices to adjust at least an actual depth of the seismic sensors to reduce the difference for each sensor.

16. The apparatus of claim 15, wherein the input control signals further operate the LFD signals to adjust the lateral positions of the seismic sensors to reduce the difference for each sensor.

17. The apparatus of claim 14, wherein the computer-readable code is further configured to periodically adjust the value for the depth and the position values for a lateral position of each of the plurality of seismic sensors, compute the difference for each of the plurality of seismic sensors, and determine whether the difference for each of the plurality of seismic sensors falls below the selected threshold.

18. The apparatus of claim 9, wherein the computer-readable code is further configured to periodically adjust the value for the depth of each of the plurality of seismic sensors so that the difference falls below the selected threshold.

\* \* \* \* \*